No. 628,154. Patented July 4, 1899.
S. ARIENTA.
SHEDDING MECHANISM FOR LOOMS.
(Application filed Jan. 26, 1899.)
(No Model.)
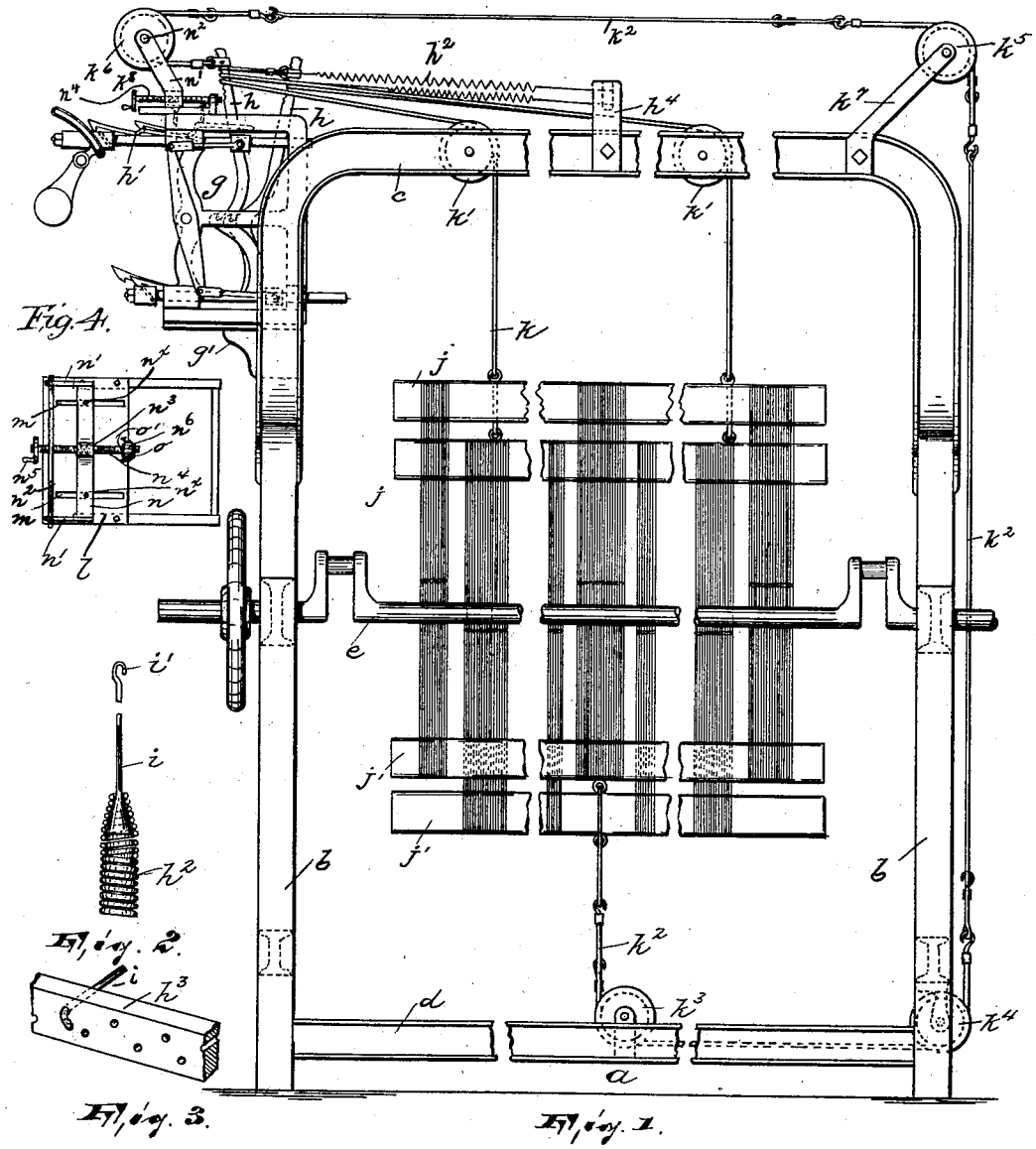
WITNESSES: Wm D. Bell. Robert J. Pollitt.
INVENTOR: Secondo Arienta,
BY Gartner & Steward
ATTORNEYS
THE NORRIS PETERS CO., PHOTO-LITHO., WASHINGTON, D. C.

UNITED STATES PATENT OFFICE.

SECONDO ARIENTA, OF PATERSON, NEW JERSEY.

SHEDDING MECHANISM FOR LOOMS.

SPECIFICATION forming part of Letters Patent No. 628,154, dated July 4, 1899.

Application filed January 26, 1899. Serial No. 703,408. (No model.)

*To all whom it may concern:*

Be it known that I, SECONDO ARIENTA, a citizen of the United States, residing in Paterson, in the county of Passaic and State of New Jersey, have invented certain new and useful Improvements in Shedding Mechanism for Looms; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to shedding mechanisms for looms; and the object of the invention is to improve upon such mechanism at present in use, so as to render the same as simple and durable in construction, as well as effective in operation, as possible.

The invention consists in the improved shedding mechanism and in the combination and arrangement of its various parts, substantially as will be hereinafter described and finally embodied in the clauses of the claim.

The invention is fully illustrated in the accompanying drawings, wherein—

Figure 1 is a front view of a portion of a loom-frame, showing the disposition of my improved shedding mechanism thereon; and Figs. 2, 3, and 4 are views of certain details of my invention.

In said drawings, $a$ indicates the loom-frame, which consists of the usual end standards $b$, surmounted by a top frame $c$ and connected near their bases by a rail $d$.

$e$ designates the main shaft of the loom, which is journaled near its ends in the two standards $b$.

$g$ designates a dobby which is supported upon brackets $g'$ upon the top frame $c$ and which may be of any usual and well-known construction and which may be operated in any suitable manner from the main shaft $e$ of the loom. The heddle-levers $h$ are fulcrumed in the frame of said dobby, being controlled, as usual, by the jacks $h'$ of the latter. The upper ends of said heddle-levers are normally held inwardly by the tension of spiral springs $h^2$, by which they are connected to a perforated cross-bar $h^3$, supported upon the brackets $h^4$ upon the top frame $c$. Each of these springs $h^2$ is tapered somewhat at each of its ends and receives one end of a connecting-rod $i$, said end being enlarged and substantially conical in shape, so as to prevent its separation from the spring, as shown in detail in Fig. 2. The rod at one end of each spring may be provided at its free end with a hook $i'$, adapted to engage the upper end of its corresponding heddle-lever $h$, whereas the rod at the other end extends through one of the apertures in the perforated cross-bar $h^3$, its extremity being preferably bent, so that it cannot be withdrawn through said aperture, as shown in Fig. 3.

$j$ designates the upper set, and $j'$ the lower set, of heddle-frames. Said upper heddle-frames $j$ are connected with the upper ends of the heddle-levers $h$ by cords $k$, which pass over pulleys $k'$, that are suitably journaled in the top frame, and the lower heddle-frames $j'$ are connected with said upper ends of the heddle-levers by a series of cords $k^2$, which extend downwardly under pulleys $k^3$ and $k^4$, journaled in the lower part of the loom-frame, and then up along one end of the latter over pulleys $k^5$ and $k^6$, respectively journaled in brackets $k^7$ and $k^8$, the former of which is supported upon the top frame of the loom and at one end thereof and the other of which is supported upon the dobby-frame in a manner now to be described.

Spanning the dobby-frame is a plate $l$, which is bolted thereto and which is provided with slots $m$, that extend longitudinally of the dobby-frame. The bracket $k^8$, which is supported upon this plate $l$ and which provides bearings for the pulleys $k^6$, consists of an elongated base-plate $n$, having forwardly and upwardly projecting arms $n'$ at its ends, said arms being connected by a shaft $n^2$, upon which said pulleys are journaled. The base-plate $n$ has downwardly-extending pins $n^\times$, which project into the slots $m$, so as to guide the bracket, and it is provided midway with an enlargement $n^3$, through which projects and with which engages a screw $n^4$, having a hand-wheel $n^5$ for rotating it and being journaled at its other end in a projection $n^6$, mounted on the plate $l$. Collars $o$ and $o'$, mounted on said screw on each side of the projection $n^6$, prevent longitudinal movement of said screw. It will thus be seen that by manipulating the screw $n^4$ the cords of the harness may be tightened or slackened at will.

Having thus fully described my invention, what I claim as new, and desire to secure by Letters Patent, is—

1. In a loom, the combination, with the frame, of a dobby mounted upon a portion thereof, heddle-levers fulcrumed in and controlled by said dobby, heddle-frames, cords connecting said heddle-frames and the levers, a bracket movably mounted on said dobby and comprising a base-plate and upwardly-extending arms, pulleys journaled in said arms, said cords passing over said pulleys, and means for adjusting said bracket, operatively connected to the base-plate thereof substantially as described.

2. In a loom, the combination, with the frame, of a dobby mounted upon a portion of said frame, heddle-levers fulcrumed in and controlled by said dobby, a plate mounted on said dobby, a bracket supported by said plate and having a sliding engagement therewith, a screw engaging said plate and penetrating and operatively connected to a portion of said bracket, pulleys journaled in said bracket, heddle-frames, and cords connecting said heddle-frames and the levers, said cords passing over said pulleys, substantially as described.

In testimony that I claim the foregoing I have hereunto set my hand this 23d day of July, 1898.

SECONDO ARIENTA.

Witnesses:
 ALFRED GARTNER,
 JOHN W. STEWARD.